United States Patent
Yoneda

(10) Patent No.: US 9,195,742 B2
(45) Date of Patent: Nov. 24, 2015

(54) REPRODUCING APPARATUS AND METHOD FOR CONTROLLING THE SAME

(71) Applicant: CANON KABUSHIKI KAISHA, Tokyo (JP)

(72) Inventor: Shigeru Yoneda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/291,382

(22) Filed: May 30, 2014

(65) Prior Publication Data

US 2014/0355956 A1 Dec. 4, 2014

(30) Foreign Application Priority Data

May 31, 2013 (JP) .................................. 2013-116249

(51) Int. Cl.
| | |
|---|---|
| H04N 5/77 | (2006.01) |
| H04N 9/80 | (2006.01) |
| G06F 17/30 | (2006.01) |
| H04N 5/76 | (2006.01) |
| H04N 9/804 | (2006.01) |
| G11B 27/10 | (2006.01) |

(52) U.S. Cl.
CPC ...... *G06F 17/30858* (2013.01); *G06F 17/3028* (2013.01); *G11B 27/105* (2013.01); *H04N 5/76* (2013.01); *H04N 9/8042* (2013.01)

(58) Field of Classification Search
USPC .......................................... 386/223–228, 248
See application file for complete search history.

(56) References Cited

U.S. PATENT DOCUMENTS

2007/0250541 A1* 10/2007 Takeda ......................... 707/200
2011/0289085 A1* 11/2011 Shiokawa et al. ............. 707/737

FOREIGN PATENT DOCUMENTS

| JP | 2005-110088 A | 4/2005 |
| JP | 2010-183248 A | 8/2010 |

* cited by examiner

*Primary Examiner* — Nigar Chowdhury
(74) *Attorney, Agent, or Firm* — Cowan, Liebowitz & Latman, P.C.

(57) ABSTRACT

A reproducing apparatus comprises a reproduction unit which reproduces a moving image file and a still image file from a recording medium, a file name including a number being added to each of the moving image file and the still image file, and a control unit which controls the reproduction unit such that the plurality of moving image files for the single scene are continuously reproduced while the still image file to which the file name including the number between the numbers included in the file names of the two moving image files is added is not reproduced, during reproduction of the plurality of moving image files for the single scene.

13 Claims, 6 Drawing Sheets

FIG. 3A

301
MVI_0001.MP4

UID : 1111
NID : 0000
PID : 0000

FIG. 3B

| 302 | 303 | 304 |
|---|---|---|
| MVI_0002.MP4 | MVI_0004.MP4 | MVI_0007.MP4 |
| UID : 1112<br>NID : 1113<br>PID : 0000 | UID : 1113<br>NID : 1114<br>PID : 1112 | UID : 1114<br>NID : 0000<br>PID : 1113 |
| 305 | 306 | 307 |
| IMG_0003.JPG | IMG_0005.JPG | IMG_0006.JPG |

| TYPE | LENGTH (BITE) | CONTENT |
|---|---|---|
| UniqueID | 16 | FILE-UNIQUE VALUE |
| Next ID | 16 | NEXT FILE UID 0: LAST FILE |
| Pre ID | 16 | PREVIOUS FILE UID 0: FIRST FILE |

REPRODUCING APPARATUS AND METHOD FOR CONTROLLING THE SAME

BACKGROUND OF THE INVENTION

1. Field of the Invention

The present invention relates to a technique for recording and reproducing a moving image and a still image.

2. Description of the Related Art

A recording apparatus for recording moving image data and still image data in a recording medium manages the recorded moving image data and still image data as a moving image file and a still image file in accordance with a predetermined file system. A DCF (Design rule for Camera File system) standard, for example, is known as a method for naming files when recording the aforementioned moving image file and still image file. In this DCF standard, file names include numbers, which are sequential numbers in order of recording.

Meanwhile, a slide show reproduction function is provided in recent digital cameras, and enables automatic reproduction of images in a memory card one by one at predetermined time intervals. In the case of performing slide show reproduction, the order in which images are recorded can be maintained by reproducing the images in order of the numbers given to the file names.

For example, Japanese Patent Laid-Open No. 2005-110088 recites, as a technique for recording and reproducing a moving image and a still image, a method of continuing reproduction until a stop instruction or an interruption instruction is received from a user in the case of reproducing a moving image, rather than reproducing both a moving image and a still image for a predetermined period of time.

Japanese Patent Laid-Open No. 2010-183248 recites a method of recording a file while dividing the file during recording of a moving image such that the file size does not exceed an upper limit size prescribed by the file system.

Moreover, recently, there are cameras capable of recording a still image during recording of a moving image.

In the case of adding sequential numbers to files names and recording a moving image while dividing the file using the aforementioned camera capable of recording a still image during recording of a moving image, if a still image is recorded during recording of a moving image before undergoing a file division, the next number of the number in the file name of the moving image that is being recorded at this point in time is assigned to the still image. For this reason, the number to be added to the moving image file after undergoing the file division is a sequential number with respect to the number assigned to the still image, and the numbers of the moving image files before and after undergoing the file division are therefore not continuous.

In general, in the case of performing slide show reproduction in a state where moving image files and still image files are mixed, the images are reproduced in accordance with the file numbers, and therefore, sequential moving image files obtained as a result of the file division when being recorded are not continuously reproduced, and the still image is reproduced between the moving image files before and after undergoing the file division.

SUMMARY OF THE INVENTION

The present invention has been made in consideration of the aforementioned problems, and realizes a technique by which moving image files constituting a single scene can be continuously reproduced even in the case where a plurality of moving image files obtained as a result of divisional recording and a still image file are given sequential numbers when being recorded.

In order to solve the aforementioned problems, the present invention provides a reproducing apparatus comprising: a reproduction unit configured to reproduce a moving image file and a still image file from a recording medium, a file name including a number being added to each of the moving image file and the still image file; and a control unit configured to control the reproduction unit such that, in a case where a still image file to which a file name including a number between numbers included in file names of two moving image files among a plurality of moving image files for a single scene is added is recorded in the recording medium, the plurality of moving image files for the single scene are continuously reproduced while the still image file to which the file name including the number between the numbers included in the file names of the two moving image files is added is not reproduced, during reproduction of the plurality of moving image files for the single scene.

In order to solve the aforementioned problems, the present invention provides a reproducing apparatus comprising: a reproduction unit configured to reproduce a moving image file and a still image file from a recording medium, a file name including a number being added to each of the moving image file and the still image file, wherein a file name including a number continuous with a number included in a file name of an immediately previously recorded file is added to each of the moving image file and the still image file; and a control unit configured to, in a case of reproducing a plurality of moving image files and a plurality of still image files in order associated with the number included in the file name, control the reproduction unit so as to continuously reproduce a plurality of moving image files storing moving image data for a single scene without reproducing a still image recorded while the moving image data for the single scene is recorded, during reproduction of the plurality of moving image files for the single scene.

In order to solve the aforementioned problems, the present invention provides a control method of a reproduction apparatus comprising: a step of reproducing a moving image file and a still image file from a recording medium, a file name including a number being added to each of the moving image file and the still image file; and a step of performing control such that, in a case where a still image file to which a file name including a number between numbers included in file names of two moving image files among a plurality of moving image files for a single scene is added is recorded in the recording medium, the plurality of moving image files for the single scene are continuously reproduced while the still image file to which the file name including the number between the numbers included in the file names of the two moving image files is added is not reproduced, during reproduction of the plurality of moving image files for the single scene.

In order to solve the aforementioned problems, the present invention provides a control method of a reproduction apparatus comprising: a step of reproducing a moving image file and a still image file from a recording medium, a file name including a number being added to each of the moving image file and the still image file, wherein a file name including a number continuous with a number included in a file name of an immediately previously recorded file is added to each of the moving image file and the still image file; and a step of, in a case of reproducing a plurality of moving image files and a plurality of still image files in order associated with the number included in the file name, performing control so as to continuously reproduce a plurality of moving image files storing moving image data for a single scene without reproducing a still image recorded while the moving image data for the single scene is recorded, during reproduction of the plurality of moving image files for the single scene.

According to the present invention, even in the case where a plurality of moving image files obtained as a result of divisional recording and a still image file are given sequential numbers when being recorded, only the moving image files constituting a single scene can be continuously reproduced.

Further features of the present invention will become apparent from the following description of exemplary embodiments (with reference to the attached drawings).

BRIEF DESCRIPTION OF THE DRAWINGS

FIGS. 3A and 3B are diagrams showing exemplary moving image files as a result of divisional recording.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments.

First Embodiment

Hereinafter, a detailed description will be given of an embodiment in which a reproducing apparatus in the present invention is applied to a recording and reproducing apparatus for recording a moving image file and a still image file in a recording medium and reproducing the recorded moving image file and still image file in order of numbers in file name.

Apparatus Configuration

Firstly, a configuration and functions of a recording and reproducing apparatus 100 in the present embodiment will be described with reference to FIG. 1.

Figure 1:
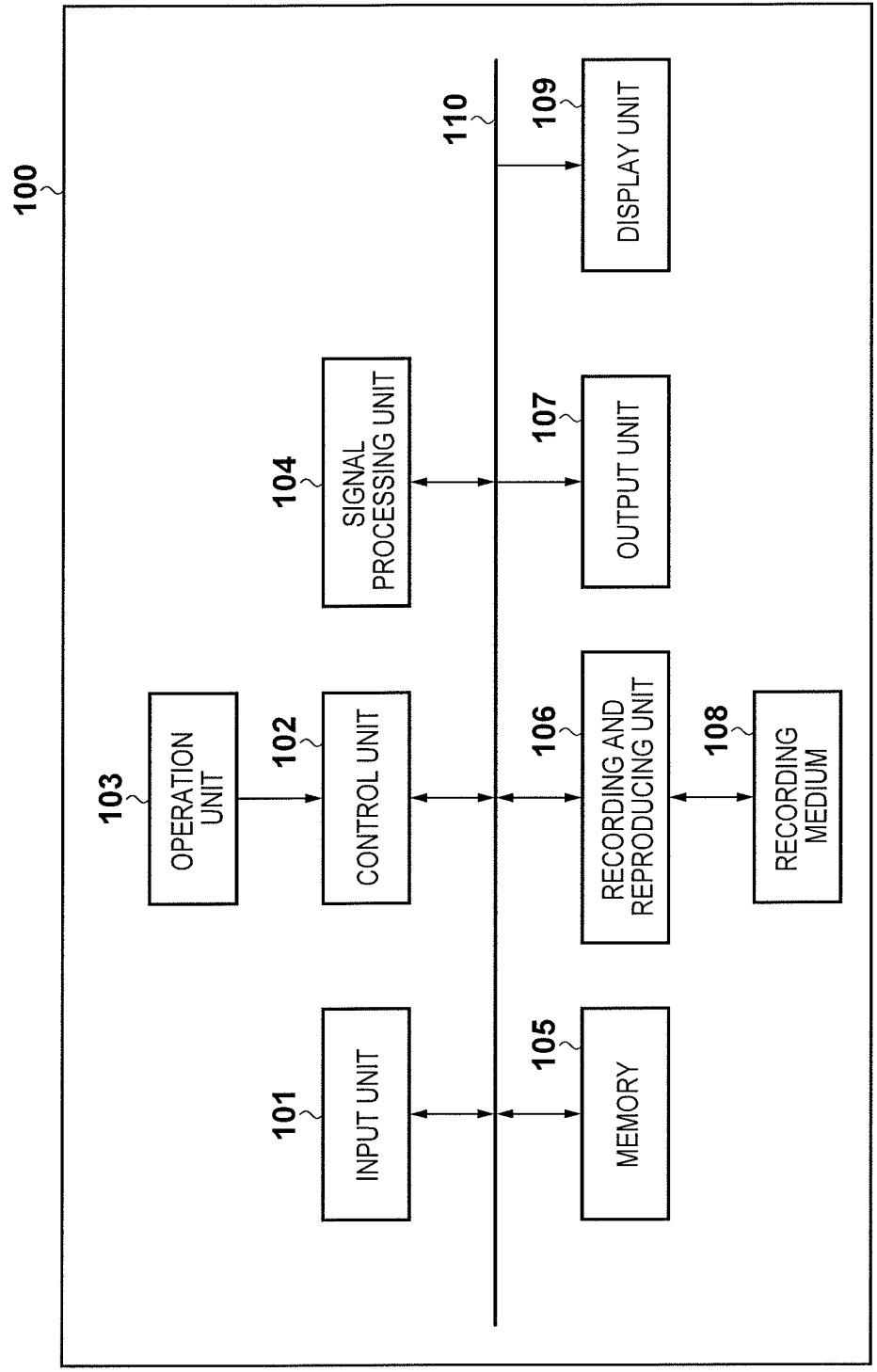
FIG. 1 is a block diagram showing an exemplary apparatus configuration in the present embodiment.

In FIG. 1, an input unit 101 acquires and outputs moving image data, still image data, and audio data. Although the input unit 101 in the present embodiment accepts input of moving image data, still image data, and audio data that are supplied from the outside of the recording and reproducing apparatus 100, the input unit 101 may be configured to include an imaging unit and a microphone, and configured to acquire moving image data and still image data by the imaging unit and acquire audio data using the microphone.

A control unit 102 controls the overall recording and reproducing apparatus 100 in accordance with input from an operation unit 103. The control unit 102 includes a microcomputer (CPU), a memory, and the like, and controls the recording and reproducing apparatus 100 in accordance with a computer program (software) stored in a nonvolatile memory (not shown). The control unit 102 contains a recording medium interface for communicating data and commands with a recording and reproducing unit 106. The operation unit 103 includes various switches that can be operated by a user. The operation unit 103 accepts various instructions, or the like, given by the user and notifies the control unit 102 thereof. The operation unit 103 also includes a power switch, a switch for giving instructions to start and stop recording, a switch for switching an operation mode of the recording and reproducing apparatus 100, and the like.

A signal processing unit 104, when in a recording mode, encodes the moving image data, still image data, and audio data that are input using the input unit 101, in accordance with a known encoding format, such as MPEG, and compresses the information amount thereof. The signal processing unit 104 also performs processing necessary for recording the moving image data, still image data, and audio data. Furthermore, the signal processing unit 104, when in a reproduction mode, decodes the reproduced moving image data, still image data, and audio data, and extends the information amount thereof. Moreover, the signal processing unit 104, when in the recording mode, outputs information of the encoded amount (data amount) of the encoded moving image data, still image data, and audio data to the control unit 102.

A memory 105 stores moving image data, still image data, and audio data. Each block of the recording and reproducing apparatus 100 processes the moving image data, still image data, and audio data by accessing the memory 105. The memory 105 also stores various kinds of information such as file system information and management information, in addition to the moving image, still image data, and audio data, and further serves as a work memory or the like for control by the control unit 102.

The recording and reproducing unit 106 writes or reads out moving image data, still image data, audio data, or various kinds of information, in/from a recording medium 108. The recording and reproducing unit 106, when in the recording mode, writes the moving image data, still image data, and audio data that are stored in the memory 105 in the recording medium 108. The recording and reproducing unit 106, when in the reproduction mode, reads out the moving image data, still image data, and audio data from the recording medium 108 and stores the read data in the memory 105. In the present embodiment, the recording medium 108 is a random-access recording medium such as a hard disk (HDD) or a flash memory card.

The recording and reproducing unit 106 manages, as files, the moving image data, still image data, audio data, and various kinds of information that are recorded in the recording medium 108, in accordance with a file system such as FAT (File Allocation Table). The recording and reproducing unit 106 has a known interface (IF) such as an ATA (AT Attachment), and communicates data and various commands with the recording medium IF in the control unit 102. Although the recording medium 108 can be easily attached to and detached from the recording and reproducing apparatus 100 using an attachment/detachment mechanism (not shown), the recording and reproducing apparatus 100 may alternatively contain the recording medium 108.

When a moving image file containing moving image data, still image data, and audio data is written in and read out from the recording medium 108, the control unit 102 controls the recording and reproducing unit 106, reproduces file system data in the recording medium 108, and stores the file system data in the memory 105. This file system data is information that indicates a file name of data stored in the recording medium 108, the file size, a data recording address, and the like, and is used for file management. The control unit 102 controls writing and reading out of a file in accordance with the file system data that is read out from the recording medium 108. The control unit 102 updates the file system data stored in the memory 105 in accordance with the state of writing the file to the recording medium 108. Then, the control unit 102 records the updated file system data in the recording medium 108, using the recording and reproducing unit 106.

In the present embodiment, a UUID (Universal Unique Identifier) is added to a moving image file when this moving image file is recorded in the recording medium 108. The UUID is identification information for uniquely identifying each moving image file. The control unit 102 generates a UUID having a different value every time a new moving image file is created. For this reason, each moving image file can be easily identified by checking the UUID value recorded in the recording medium 108.

The user can give instructions to switch the operation mode of the recording and reproducing apparatus 100, and to start and stop recording of moving image data, by operating the operation unit 103. An output unit 107 outputs the reproduced moving image data, still image data, and audio data to a display device or the like that is provided outside the recording and reproducing apparatus 100. A display unit 109 displays a moving image and various kinds of information on a display device such as a liquid crystal panel. A data bus 110 is used to transmit and receive data, various kinds of control command, and the like to and from each unit in the recording and reproducing apparatus 100.

Recording Processing

Next, moving image data recording processing in the present embodiment will be described. Note that the recording processing is realized by the control unit 102 deploying a control program stored in a nonvolatile memory (not shown) in the memory 105 and executing this control program.

Initially, upon receiving, from the operation unit 103, an instruction to switch the operation mode to the recording mode, the recording and reproducing apparatus 100 transitions to a recording standby state and waits for a recording start instruction. In this recording standby state, moving image data that is input from the input unit 101 is displayed in the display unit 109. Upon the recording start instruction being input from the operation unit 103, the signal processing unit 104 reads out moving image data that has been input from the input unit 101 and stored in the memory 105, and starts to encode the moving image data. The encoded data is stored in the memory 105 by the signal processing unit 104.

In the present embodiment, since the data rate of the data encoded by the signal processing unit 104 is lower than the data rate at which recording in the recording medium 108 is possible, the encoded data is temporarily stored in the memory 105. Every time the data amount of the encoded data stored in the memory 105 reaches a first predetermined amount, the recording and reproducing unit 106 reads out the encoded data from the memory 105 and records the read encoded data in the recording medium 108. The recording and reproducing unit 106 temporarily stops reading out of the encoded data from the memory 105 and interrupts processing for recording the encoded data in the recording medium 108 at the point in time when the data amount of the encoded data stored in the memory 105 has decreased to a second predetermined amount that is smaller than the first predetermined amount. The above-described processing is repeatedly performed. At this time, if a file is not opened, the control unit 102 gives the recording and reproducing unit 106 an instruction to create and open a new file for recording the encoded data and record the encoded data as a moving image file. The control unit 102 also determines a file name to be added to the newly created file and gives an instruction to the recording and reproducing unit 106, as described later. The recording and reproducing unit 106 records a file entry including the file name of the newly created file in the recording medium 108.

Every time writing in the recording medium 108 is completed once, the control unit 102 updates the file system data stored in the memory 105, based on the recording position of the encoded data that is written at this time. The control unit 102 then controls the recording and reproducing unit 106 to read out the updated file system data from the memory 105 and record the read file system data in the recording medium 108.

The control unit 102 also generates a UUID having a numeric value of a predetermined bit length by combining an identification number of the recording and reproducing apparatus 100, the recording date and time, the total number of times of recording since the apparatus started to be used, a random number that is prepared in advance, and the like. The control unit 102 then gives the recording and reproducing unit 106 an instruction to record this UUID while adding the UUID as identification information (unique ID) that is unique to this file to a management information area of the moving image file, as described later. The control unit 102, upon receiving the recording start instruction, generates the UUID having a different value every time a new moving image file is created.

Figures 4, 5:
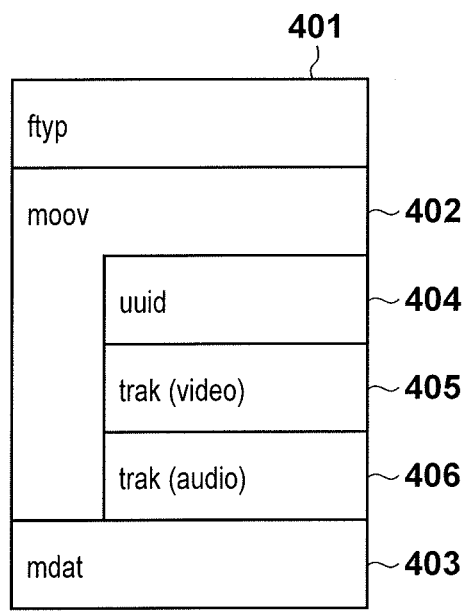
FIG. 4 is a diagram showing an exemplary configuration of a moving image file.
FIG. 5 is a diagram showing an exemplary configuration of identification information.

In the present embodiment, a moving image file is recorded in accordance with the MP4 file format. FIG. 4 shows an exemplary configuration of an MP4 file. The MP4 file has a tree structure such as one shown in FIG. 4, and each tree structure has elements called boxes.

The boxes in the uppermost layer include an ftyp box 401, a moov box 402, and an mdat box 403. The ftyp box 401 stores compatibility information, and the moov box 402 stores management information regarding moving image data and audio data. The mdat box 403 stores actual data of the moving image data and audio data. At the time of recording, recording is performed while the moving image data and audio data are added in the mdat box 403.

The moov box 402 stores a plurality of trak boxes 405 and 406, and a uuid box 404. In the present embodiment, an ID (unique ID) that is unique to each moving image file is stored in the uuid box 404. Furthermore, in the case of closing a moving image file that is being recorded and recording a new moving image file, additional information for identifying an immediately subsequent file and additional information for identifying an immediately previous file are generated and stored in the uuid box 404.

FIG. 5 shows the content of the identification information stored in the uuid box 404. As a Unique ID (UID), a unique value having a 16-byte length is stored for each moving image file. Specifically, the value of the UUID is stored. As a NextID (NID), a value of the identification information (UID) of the next file is stored if a plurality of moving image files are recorded during one time of recording from when the recording start instruction is given by the user until when the recording stop instruction is given. In the case of the last file during one time of recording, a predetermined value, e.g., 0 is stored here. As a PreID (PID), a value of the identification information (UID) of the previous file is stored if a plurality of moving image files are recorded during one time of recording. In the case of the first file during one time of recording, a predetermined value, e.g., 0 is stored here.

In the present embodiment, the control unit 102 monitors the size of a file that is being recorded, by means of notifications from the recording and reproducing unit 106 and the signal processing unit 104. The control unit 102 controls the recording and reproducing unit 106, and if the size of the file that is being recorded has reached a threshold (file division threshold) for determining whether to perform a file division, the control unit 102 closes the file that is being recorded, creates a new moving image file, and continues the recording. In the present embodiment, the file division threshold is determined based on the upper limit file size that is predetermined by the file system. That is to say, in the present embodiment, the file division threshold is a value smaller than the upper limit file size by a predetermined amount.

In the case of using an FAT32 file system, the maximum value of the size of a single file is limited to 4 gigabytes (GB), and therefore the file division threshold is set to a value smaller than the 4 GB upper limit by the predetermined amount.

Upon the file size reaching the file division threshold during recording, the control unit 102 gives the recording and reproducing unit 106 an instruction to close the file that is currently open, open a new file, and continue recording of the encoded data.

As described above, recording is continued while dividing files every time the file size reaches the file division threshold while a moving image is being recorded.

If a recording stop instruction is received from the operation unit 103 while a moving image is being recorded, the control unit 102 stops encoding of moving image data performed by the signal processing unit 104, and closes the file that is being recorded by the recording and reproducing unit 106. Then, the control unit 102 gives the recording and reproducing unit 106 an instruction to change the content of the file system data and record the changed content in the recording medium 108.

If an instruction to record a still image is received from the operation unit 103 while a moving image is being recorded, the control unit 102 gives the recording and reproducing unit 106 an instruction to encode still image data using the signal processing unit 104 and record the encoded still image file in the recording medium 108.

In the present embodiment, a file name including a number is added to each file of a recorded moving image and still image. In the case of creating a new moving image file or still image file, the control unit 102 determines a value obtained by adding a predetermined value, which is 1 here, to the number included in the file name of the previously recorded file as the number of the newly recorded file. In the case where the power is turned on, or the recording medium 108 is newly attached, the control unit 102 checks moving image files or still image files recorded in the recording medium 108. If moving image files or still image files have already been recorded in the recording medium 108, the control unit 102 determines a value obtained by adding a predetermined value to the largest value among the file numbers added to the moving image files or the still image files that have already been recorded as the number to be added to a moving image file or a still image file to be recorded next. For this reason, if a still image is recorded while a moving image is being recorded, a value obtained by adding a predetermined value to the number added to the moving image file that is being recorded is added to the still image file as the number thereof. If no moving image file or still image file has been recorded in the recording medium 108, the control unit 102 determines a predefined value, which is 0001 here, as the number to be added to a moving image file or a still image file to be recorded next.

FIGS. 3A and 3B show an exemplary content of moving image files and still image files that are recorded by the recording and reproducing apparatus in the present embodiment.

FIG. 3A shows a content of a moving image file in the case where the moving image file is not divided while being recorded from when a recording start instruction is given until when a recording stop instruction is given. A moving image file 301 is created upon recording being started, and a recording stop instruction is given before the size of the moving image file 301 reaches the file division threshold. In this case, for example, 1111 is stored as the UID, and 0 (0000) is stored as the NID and the PID.

FIG. 3B shows a content of moving image files in the case where three moving image files are recorded from when a recording start instruction is given until when a recording stop instruction is given. Upon recording being started, a moving image file 302 is created. Upon the size of the moving image file 302 reaching the file division threshold, the file 302 is closed and a new file 303 is created. For example, 1112 is stored as the UID of the file 302, and 1113, which is the UID of the next file, is stored as the NID of the file 302. Since the file 302 is the first file after recording is started, 0 (0000) is stored as the PID. Upon the size of the moving image file 303 reaching the file division threshold, the file 303 is closed and a new file 304 is created. For example, 1113 is stored as the UID of the file 303, and 1112, which is the UID of the file 302, is stored as the PID of the file 303. Upon a recording stop instruction being given while the moving image file 303 is being recorded, 1113, which is the UID of the file 303, is stored as the PID of the file 304. Since the file 304 is the last file during one time of recording, 0 is stored as the NID.

Thus, in the present embodiment, if moving image data is recorded while being divided into a plurality of moving image files during one time of recording of a moving image, the identification information of the immediately previously and immediately subsequent files is recorded by being stored as the additional information in the moving image files. For this reason, it can be easily perceived that these moving image files have been recorded during one time of recording of the moving image.

Note that although the NID of a moving image file that is being recorded is set when recording is stopped or if the file size has reached the file division threshold in the present embodiment, the NID may alternatively be set when the file is created. For example, if the UID of the next moving image file can be generated when the file is created, the UID of the next moving image file is set as the NID, and is recorded together with the PID in the recording medium. Then, if a recording stop instruction is given while this moving image file is being recorded, the already-recorded NID value is changed to a predetermined value (0).

Alternatively, the NID value is set to 0 and recorded together with the PID when the file is created. If the size of this moving image file has reached the file division threshold, the NID value is changed based on the UID of the next moving image file.

Figure 6:
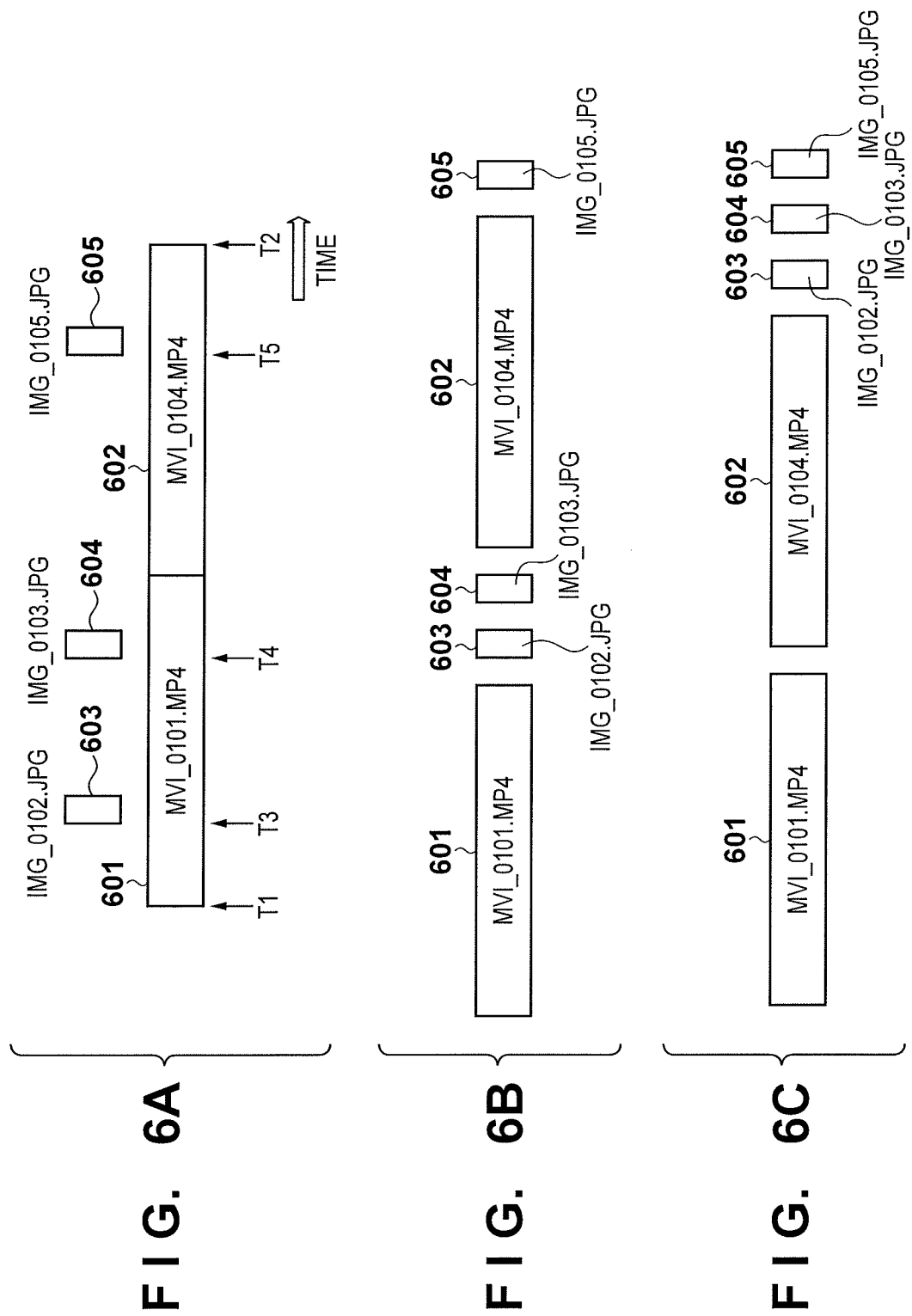
FIGS. 6A to 6C are diagrams illustrating file reproduction processing according to the first embodiment.

FIG. 6A shows exemplary moving image files and still image files that are recorded in the recording medium, and in FIG. 6A, an instruction to start recording of a moving image is given at time T1, and a recording stop instruction is given at time T2. Since the size of a moving image file 601 has reached the threshold during recording of the file 601, a new moving image file 602 is recorded. An instruction to record a still image is given respectively at time T3 and time T4 during recording of the moving image file 601, and still image files 603 and 604 are recorded. An instruction to record a still image is given at time T5 during recording of the moving image file 602, and a still image file 605 is recorded.

If the moving images and the still images are thus recorded, numbers shown in FIG. 6A are added to the respective file names.

If the thus-recorded moving image files and still image files are reproduced in order of the numbers in the file names, these files are reproduced in order shown in FIG. 6B. That is to say, still image files 603 and 604 are reproduced that were recorded between two moving image files 601 and 602 recorded from when an instruction to start one time of recording is given by the user until when a recording stop instruction is given.

Next, processing for normally reproducing a moving image and a still image will be described. If a reproduction mode instruction is given from the operation unit 103, the control unit 102 controls the recording and reproducing unit 106 to reproduce representative images (thumbnail images) of a moving image file and a still image file recorded in the recording medium 108. The control unit 102 then controls the signal processing unit 104 to generate an index screen containing the thumbnail images of the files and displays the index screen in the display unit 109.

The user operates the operation unit 103 to select one of the displayed thumbnail images and gives an instruction to reproduce the still image or the moving image.

The control unit 102 controls the recording and reproducing unit 106 to reproduce the moving image file or still image file designated by the user. The signal processing unit 104 processes the reproduced moving image file or still image file and displays the processed file in the display unit 109. For example, if the file designated by the user is a still image file, the control unit 102 displays the still image in the display unit 109 until an instruction to change the file or to display the index screen is given by the user.

If the file designated by the user is a moving image file, the control unit 102 detects the NID of the moving image file that is being reproduced. When reproduction of the moving image file that is being reproduced comes to the end, the control unit 102 gives the recording and reproducing unit 106 an instruction to reproduce the moving image file having the UID described as the NID of the moving image file that is being reproduced. If the NID of the moving image file that is being reproduced is 0, the control unit 102 reproduces this moving image file to the end, thereafter stops reproduction of the moving image file, and displays the index screen.

Reproduction List Generation Processing

Hereinafter, reproduction list generation processing in the present embodiment will be described with reference to FIG. 2.

Figure 2:
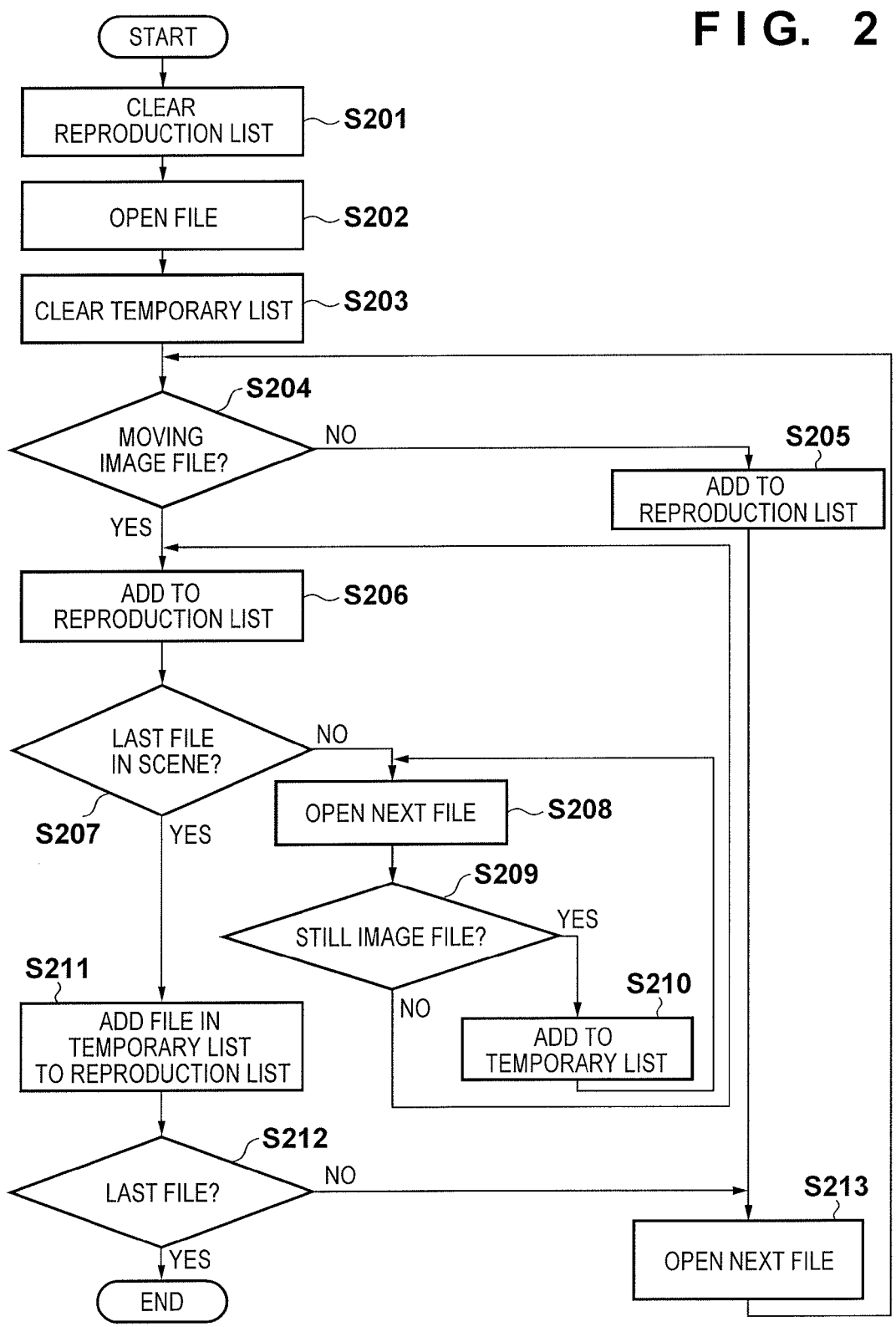
FIG. 2 is a flowchart showing reproduction list generation processing according to a first embodiment.

Note that the processing in FIG. 2 is realized by the control unit 102 deploying a control program stored in a nonvolatile memory (not shown) in the memory 105 and executing the control program.

If a power-on instruction is given, or if the recording medium 108 is newly attached, the control unit 102 starts the processing in FIG. 2.

The control unit 102 initially clears a reproduction list area reserved in the memory 105 (S201). Next, the control unit 102 controls the recording and reproducing unit 106 to open (read out) the first file among files recorded in the recording medium 108 (S202).

Next, the control unit 102 clears a temporary list area reserved in the memory 105 (S203).

Next, the control unit 102 determines whether or not the file opened in step S202 is a moving image file (S204). If a result of the determination is that the opened file is a still image file (NO in S204), the control unit 102 adds this still image file to a reproduction list (S205) and opens the next file (S213). On the other hand, if the opened file is a moving image file (YES in S204), the control unit 102 adds this moving image file to the reproduction list (S206), and determines whether or not the moving image file is the last file in a scene, based on the NID value (S207). If a result of the determination is that the moving image file is not the last file in a scene (NO in S207), the control unit 102 controls the recording and reproducing unit 106 to open the next file (S208).

Next, the control unit 102 determines whether or not the file opened by the recording and reproducing unit 106 is a still image (S209), and if the opened file is a still image file (YES in S209), the control unit 102 adds this still image file to the temporary list (S210). Then, the control unit 102 opens the next file using the recording and reproducing unit 106 (S208).

In the case of the moving image file (NO in S209), the control unit 102 adds the moving image file to the reproduction list (S206), and again determines whether or not this file is the last file among a plurality of moving image files constituting a single scene (S207).

If a result of the determination in step S207 is that the file is the last file in a scene (YES in S207), the control unit 102 adds, to the reproduction list, the still image file in the temporary list (S211).

Next, the control unit 102 determines whether or not the next file is recorded in the recording medium 108 (S212). If it is determined that the next file is recorded (NO in S212), the control unit 102 controls the recording and reproducing unit 106 to open the next file (5213), and returns to step S204. On the other hand, if the file is the last file (YES in S212), this processing ends.

Next, slide show reproduction will be described. If the user operates the operation unit 103 and gives a slide show reproduction instruction, the control unit 102 reproduces moving image files and still image files in accordance with the reproduction list stored in the memory 105. That is to say, if the slide show reproduction instruction is given, the control unit 102 controls the recording and reproducing unit 106 so as to reproduce files based on the reproduction list stored in the memory 105 in order starting from the file registered on the top of the reproduction list.

If an instruction to stop slide show reproduction is given from the operation unit 103, the control unit 102 stops slide show reproduction.

According to the present embodiment, during slide show reproduction, for example, the moving image files and the still image files recorded as shown in FIG. 6A are reproduced such that the moving image files 601 and 602 are reproduced first, and subsequently the still image files 603 to 605 are reproduced, as shown in FIG. 6C. Thus, still image files will not be reproduced in the course of reproduction of a plurality of moving image files constituting a single scene recorded from when recording is started until when the recording is stopped.

As described above, in the case where moving image files and still image files are given sequential numbers when being recorded, a plurality of moving image files constituting a single scene are detected, a still image file having a file name including a number continuous with the numbers included in the file names of the detected moving image files is saved in the temporary list, and it is thereby possible to register only the moving image files constituting the single scene in the reproduction list, and continuously reproduce these moving image files. Furthermore, the still image file saved in the temporary list can be continuously reproduced after the moving image files are reproduced. Note that the reproduction list may be generated so as to continuously reproduce moving image files obtained as a result of divisional recording, after the still image file saved in the temporary list is reproduced.

Second Embodiment

Next, slide show reproduction processing according to a second embodiment will be described with reference to FIG. 7.

In the present embodiment, a plurality of moving image files constituting a single scene is reproduced, without using the reproduction list. In addition, control is performed such that moving image files obtained as a result of divisional recording is continuously reproduced, and a still image file that has been recorded during recording of the moving image is not reproduced.

Figure 7:
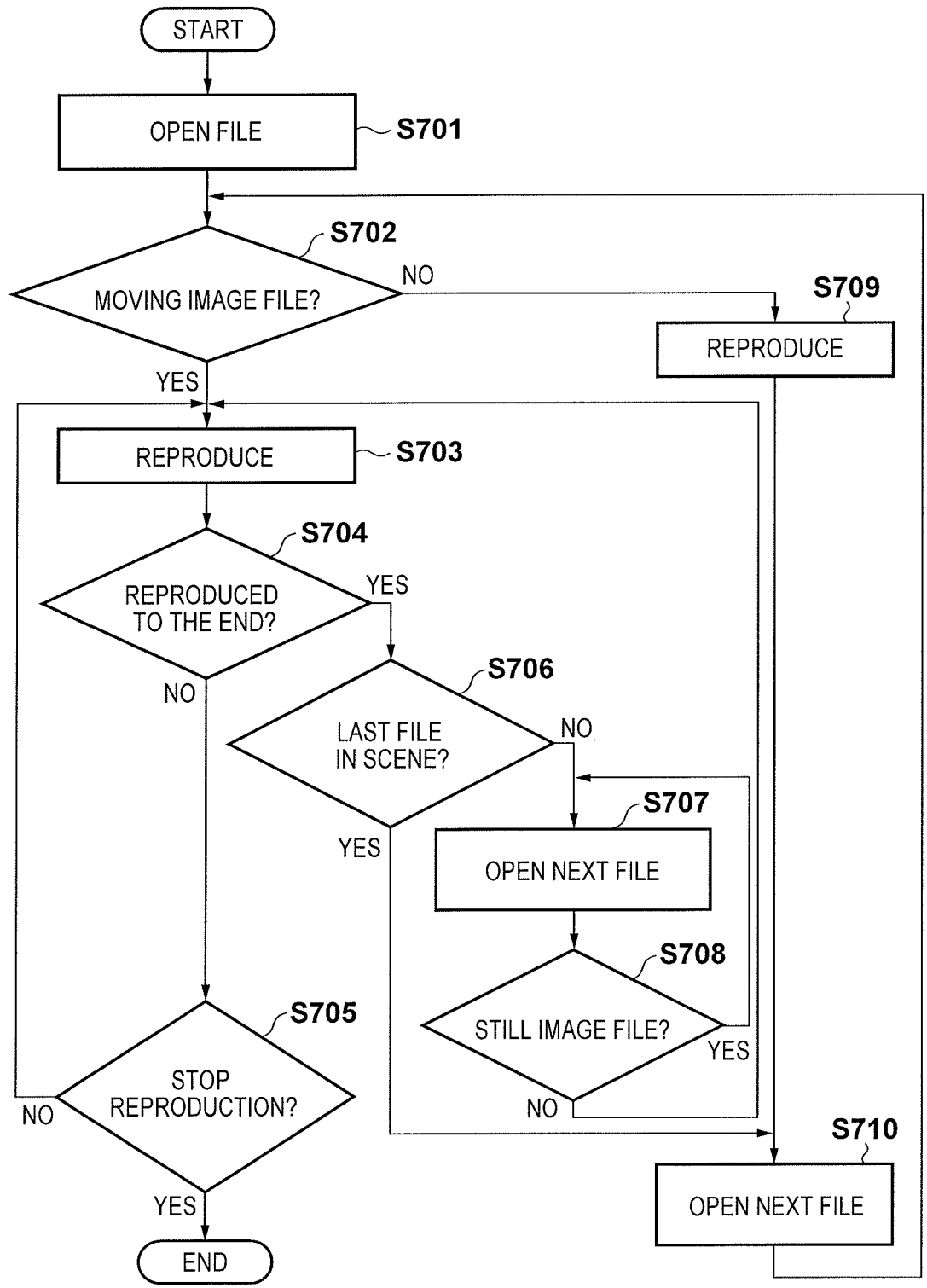
FIG. 7 is a flowchart showing file reproduction processing according to a second embodiment.

Note that similarly to the processing in FIG. 2, the processing in FIG. 7 is also realized by the control unit 102 deploying a control program stored in a nonvolatile memory (not shown) in the memory 105 and executing the control program.

The control unit 102 starts the processing in FIG. 7 in the case of receiving an instruction to start slide show reproduction from the operation unit 103.

The control unit 102 initially controls the recording and reproducing unit 106 to open the first file among files recorded in the recording medium 108 (S701).

Next, the control unit 102 determines whether or not the file opened in step S701 is a moving image file (S702). If a result of the determination is that the opened file is not a moving image file (NO in S702), the opened file is a still image file, and accordingly the control unit 102 controls the recording and reproducing unit 106 to continue reproduction for a predetermined period (S709), and after reproduction of the still image is finished, the control unit 102 controls the recording and reproducing unit 106 to open the next file (S710). On the other hand, if the opened file is a moving image file (YES in S702), the control unit 102 controls the recording and reproducing unit 106 to reproduce the moving image (S703), and determines whether or not the moving image has been reproduced to the end (S704). If the moving image file has not been reproduced to the end (NO in S704), the control unit 102 determines whether or not a reproduction stop instruction has been given from the operation unit 103 (S705), and if the reproduction stop instruction has been given (YES in S705), the control unit 102 controls the recording and reproducing unit 106 to end slide show reproduction. On the other hand, if the reproduction stop instruction has not been given (NO in S705), the processing returns to step S703 and reproduction is continued. If it is detected in step S704 that the moving image file has been reproduced to the end (YES in S704), the control unit 104 determines whether or not this file is the last moving image file in a single scene (S706). If the file is the last file in a single scene (YES in S706), the control unit 102 controls the recording and reproducing unit 106 to open the next file (S710).

If the moving image file is not the last file in a single scene (NO in S706), the control unit 102 controls the recording and reproducing unit 106 to open the next file (S707). Next, the control unit 102 determines whether or not the opened file is a still image file (S708), and if the opened file is a still image file (YES in S708), the processing returns to step S707, and the control unit 102 controls the recording and reproducing unit 106 to open the next file.

On the other hand, if the opened file is a moving image file (NO in S708), the control unit 102 controls the recording and reproducing unit 106 to reproduce this moving image file (S703).

As described above, in the case where moving image files and still image files are given sequential numbers when being recorded, a plurality of moving image files constituting a single scene are detected, a still image file having a file name including a number continuous with the numbers included in the file names of the detected moving image files is not reproduced, and it is thereby possible to continuously reproduce only the moving image files constituting the single scene.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-116249, filed May 31, 2013 which is hereby incorporated by reference herein in its entirety.

What is claimed is:

1. A reproducing apparatus comprising:
a reproduction unit configured to reproduce a moving image file and a still image file from a recording medium, a file name including a number being added to each of the moving image file and the still image file; and
a control unit configured to control the reproduction unit such that, in a case where a still image file to which a file name including a number between numbers included in file names of two moving image files among a plurality of moving image files for a single scene is added is recorded in the recording medium, the plurality of moving image files for the single scene are continuously reproduced while the still image file to which the file name including the number between the numbers included in the file names of the two moving image files is added is not reproduced, during reproduction of the plurality of moving image files for the single scene.

2. The apparatus according to claim 1, wherein
the control unit controls the reproduction unit so as to reproduce the still image file to which the file name including the number between the numbers included in the file names of the two moving image files is added, after the plurality of moving image files for the single scene are reproduced.

3. The apparatus according to claim 1, wherein
the control unit controls the reproduction unit so as to reproduce the still image file to which the file name including the number between the numbers included in the file names of the two moving image files is added, before reproduction of the plurality of moving image files for the single scene is started.

4. The apparatus according to claim 1, further comprising:
a recording unit configured to record the moving image file and the still image file in the recording medium,
wherein if a moving image file is recorded immediately previously, the recording unit adds a file name including a number continuous with a number included in a file name of the immediately previously recorded moving image file to a newly recorded moving image file or still image file,
if a still image file is recorded immediately previously, the recording unit adds a file name including a number continuous with a number included in a file name of the immediately previously recorded still image file to a newly recorded moving image file or still image file, and
the control unit controls the reproduction unit so as to determine a reproduction order of the moving image file and the still image file, based on the number included in the file name of the moving image file and the number included in the file name of the still image file recorded in the recording medium, and reproduce the moving image file and the still image file in the determined order.

5. The apparatus according to claim 4, wherein
the recording unit records moving image data for a single scene in the recording medium by storing the moving image data for the single scene in a plurality of moving image files, and
the recording unit records the still image file in the recording medium in accordance with a still image recording instruction during recording of the moving image data.

6. The apparatus according to claim 1, wherein
the control unit detects the plurality of moving image files for the single scene, based on additional information of the moving image files.

7. The apparatus according to claim 1, wherein
the control unit generates a reproduction list for controlling the reproduction unit so as to continuously reproduce the plurality of moving image files for the single scene without reproducing the still image file to which the file name including the number between the numbers included in the file names of the two moving image files is added.

8. The apparatus according to claim 1, wherein
the plurality of moving image files for the single scene include a first moving image file to which a file name including a first number is added, and a second moving image file to which a file name including a second number that is larger than the first number is added, and
the control unit controls the reproduction unit so as not to reproduce at least one still image file to which a file name including a number between the first number and the second number is added, during reproduction of the plurality of moving image files for the single scene.

9. A reproducing apparatus comprising:
a reproduction unit configured to reproduce a moving image file and a still image file from a recording medium, a file name including a number being added to each of the moving image file and the still image file, wherein a file name including a number continuous with a number included in a file name of an immediately previously recorded file is added to each of the moving image file and the still image file; and
a control unit configured to, in a case of reproducing a plurality of moving image files and a plurality of still image files in order associated with the number included in the file name, control the reproduction unit so as to continuously reproduce a plurality of moving image files storing moving image data for a single scene without reproducing a still image recorded while the moving image data for the single scene is recorded, during reproduction of the plurality of moving image files for the single scene.

10. The apparatus according to claim 9, wherein
the control unit controls the reproduction unit so as to reproduce a still image file to which a file name including a number between numbers included in file names of two moving image files among the plurality of moving image files for the single scene is added, after the plurality of moving image files for the single scene are reproduced.

11. The apparatus according to claim 9, wherein
the control unit controls the reproduction unit so as to reproduce the still image file to which a file name including a number between numbers included in file names of two moving image files among the plurality of moving image files for the single scene is added, before reproduction of the plurality of moving image files for the single scene is started.

12. A control method of a reproduction apparatus comprising:
a step of reproducing a moving image file and a still image file from a recording medium, a file name including a number being added to each of the moving image file and the still image file; and
a step of performing control such that, in a case where a still image file to which a file name including a number between numbers included in file names of two moving image files among a plurality of moving image files for a single scene is added is recorded in the recording medium, the plurality of moving image files for the single scene are continuously reproduced while the still image file to which the file name including the number between the numbers included in the file names of the two moving image files is added is not reproduced, during reproduction of the plurality of moving image files for the single scene.

13. A control method of a reproduction apparatus comprising:
a step of reproducing a moving image file and a still image file from a recording medium, a file name including a number being added to each of the moving image file and the still image file, wherein a file name including a number continuous with a number included in a file name of an immediately previously recorded file is added to each of the moving image file and the still image file; and
a step of, in a case of reproducing a plurality of moving image files and a plurality of still image files in order associated with the number included in the file name, performing control so as to continuously reproduce a plurality of moving image files storing moving image data for a single scene without reproducing a still image recorded while the moving image data for the single scene is recorded, during reproduction of the plurality of moving image files for the single scene.

* * * * *